(12) United States Patent
Lee

(10) Patent No.: US 11,433,548 B2
(45) Date of Patent: Sep. 6, 2022

(54) ROBOT SYSTEM AND CONTROL METHOD THEREOF

(71) Applicant: LG ELECTRONICS INC., Seoul (KR)

(72) Inventor: Dongeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 16/580,598

(22) Filed: Sep. 24, 2019

(65) Prior Publication Data

US 2021/0053231 A1 Feb. 25, 2021

(30) Foreign Application Priority Data

Aug. 22, 2019 (KR) .................... 10-2019-0103283

(51) Int. Cl.
*B25J 11/00* (2006.01)
*B25J 9/16* (2006.01)
*A47J 36/32* (2006.01)
*G01G 19/34* (2006.01)
*G01G 19/42* (2006.01)

(52) U.S. Cl.
CPC .......... *B25J 11/0045* (2013.01); *A47J 36/32* (2013.01); *B25J 9/1697* (2013.01); *G01G 19/346* (2013.01); *G01G 19/42* (2013.01)

(58) Field of Classification Search
CPC . B25J 11/00; B25J 11/0045; B25J 9/00; B25J 9/16; B25J 9/1602; B25J 9/161; B25J 9/1679; B25J 9/0009; B25J 9/1694; B25J 9/1697; B25J 13/00; B25J 13/003; B25J 13/08; B25J 19/023; A47J 36/32; A47J 47/14; G01G 19/22; G01G 19/40; G01G 19/52; G01G 19/34; G01G 19/346; G01G 19/42; G01G 19/56; G05B 2219/36039
USPC .......................................................... 700/245
See application file for complete search history.

(56) References Cited

U.S. PATENT DOCUMENTS

| 2015/0260566 | A1* | 9/2015 | Conder | G01G 19/4144 |
| | | | | 177/25.13 |
| 2020/0054175 | A1* | 2/2020 | Roy | B25J 11/0045 |
| 2020/0154948 | A1* | 5/2020 | Grass | A47J 44/00 |
| 2021/0391051 | A1* | 12/2021 | Ochiai | G05B 19/042 |

\* cited by examiner

*Primary Examiner* — Khoi H Tran
*Assistant Examiner* — Sarah A Tran
(74) *Attorney, Agent, or Firm* — Birch, Stewart, Kolasch & Birch, LLP

(57) ABSTRACT

According to embodiments, a robot system configured to determine a recipe from an ingredient list obtained by detecting a type and an amount of an ingredient includes: a storage table configured to detect a weight change by a scale installed under each of cells that store ingredients according to types of the ingredients, detect the cell of which a weight is changed according to an ingredient selection of a user to identify the type of the ingredient, and identify the amount of the ingredient based on a degree of the weight change of the cell; and a robot configured to receive the ingredient list obtained from the type and the amount of the ingredient identified by the storage table from the storage table, retrieve menus to be cooked with the ingredient list, and perform cooking by determining the recipe according to a menu selected from the menus.

14 Claims, 7 Drawing Sheets

ROBOT SYSTEM AND CONTROL METHOD THEREOF

CROSS-REFERENCE TO RELATED APPLICATIONS

The present application claims priority under 35 U.S.C. 119 and 35 U.S.C. 365 to Korean Patent Application No. 10-2019-0103283 (filed on Aug. 22, 2019), which is hereby incorporated by reference in its entirety.

FIELD

The present disclosure relates to a robot system and a control method thereof, and more particularly, to a robot configured to determine a recipe by checking a type and an amount of an ingredient.

BACKGROUND

Recently, functions of a robot are expanding due to development of a deep learning technology, a self-driving technology, an automatic control technology, the Internet of Things, and the like.

In regard to each technology in detail, the deep learning is one of the fields of machine learning. The deep learning is a technology that allows a program to make similar determinations in various situations, not a scheme of checking conditions and setting commands in the program in advance. Accordingly, the deep learning allows a computer to think similarly to a human brain and analyze massive amounts of data.

Self-driving is a technology that allows a machine to move under the determination on its own and avoid an obstacle. According to the self-driving technology, a robot may autonomously recognize a location through a sensor to move and avoid an obstacle.

The automatic control technology refers to a technology for automatically controlling an operation of a machine by feeding back a measured value, which is obtained by inspecting a state of the machine in the machine, to a control device. Accordingly, the machine may be controlled without a human operation, and a control target may be automatically adjusted to fall within a targeted range, that is, to a target value.

The Internet of Things refers to an intelligent technology and service that connects all things based on the Internet to communicate information between a person and a thing, and between things. Devices connected to the Internet by the Internet of Things may transmit and receive the information to autonomously communicate with each other without any assist of a human.

The application fields of robots are generally classified into industrial robots, medical robots, astronautic robots, and submarine robots. For example, the robot may perform repetitive tasks in the machining industry such as automobile manufacturing. In other words, many industrial robots have already been in operation in which the robots repeat the same motion for hours once a task performed by an arm of the human is taught to the robots.

In this regard, a technology for monitoring the progress of foods with a camera or the like has been disclosed in public, but there is no robot that controls the cooking by determining a recipe based on ingredients.

SUMMARY

Embodiments provide a robot system and a control method thereof for determining a recipe by identifying an ingredient.

In order to achieve the above object, according to an embodiment, a robot system configured to determine a recipe from an ingredient list obtained by detecting a type and an amount of an ingredient includes: a storage table configured to detect a weight change by a scale installed under each of cells that store ingredients according to types of the ingredients, detect the cell of which a weight is changed according to an ingredient selection of a user to identify the type of the ingredient, and identify the amount of the ingredient based on a degree of the weight change of the cell; and a robot configured to receive the ingredient list obtained from the type and the amount of the ingredient identified by the storage table from the storage table, retrieve menus to be cooked with the ingredient list, and perform cooking by determining the recipe according to a menu selected from the menus.

In some embodiments, the storage table may include: a memory configured to store the type of the ingredient stored in each of the cells; a processor configured to retrieve the cell of which the weight is changed from the memory to identify the type of the ingredient, and obtain the ingredient list based on the type and the amount of the ingredient; a communication unit configured to transmit the ingredient list to the robot; and a display unit configured to display the type and the amount of the ingredient and the ingredient list to allow the user to identify the type and the amount of the ingredient and the ingredient list.

In some embodiments, the storage table may include: a pincette configured to move the ingredient from the cell to a bowl of the user; and a 3D cam configured to track the movement of the pincette, wherein the type of the ingredient may be tracked based on the movement from the pincette to the cell.

In some embodiments, the robot may include: a communication module configured to receive the ingredient list from the storage table; and a control module configured to select the menu to be cooked with the ingredient list, determine the recipe according to the selected menu, and control the cooking according to the recipe.

In some embodiments, the control module may be configured to classify a menu stored in the memory and an ingredient included in the menu, calculate a similarity between an ingredient of the ingredient list and the ingredient included in the menu to select a menu with a largest similarity, and control the cooking with the recipe of the selected menu.

In some embodiments, the control module may be configured to primarily compare the ingredient of the ingredient list with the ingredient of the menu, and secondarily compare an amount of the ingredient of the menu with an amount of the ingredient included in the ingredient list.

In some embodiments, the control module may be configured to recommend an additional ingredient to the user during or after the control of the cooking.

In some embodiments, the robot may further include: an input module configured to receive a command of the user through at least one of a touch, a button, or a voice input from the user; and an output module configured to express the command of the input module and an operational state of the control module to the user by using a screen or a sound.

In addition, according to an embodiment, a method of controlling a robot system which is configured to determine a recipe by measuring a weight change of each of cells in a storage table that stores an ingredient includes: identifying a type of the ingredient by detecting a cell of which a weight is changed according to an ingredient selection of a user through a scale installed under the cell, and identifying an amount of the ingredient by calculating the weight change of the cell; obtaining, by the storage table, an ingredient list through the type and the amount of the ingredient to transmit the ingredient list to a robot; and determining, by the robot, the recipe according to the menu by retrieving a menu to be cooked with the ingredient list.

In some embodiments, the identifying of the type and the amount of the ingredient may include: storing a name of the ingredient stored in each of the cells in a memory; detecting a position of the cell of which the weight is changed; and retrieving the detected position of the cell from the memory to identify the name of the ingredient, and identifying the amount of the ingredient from the weight change of the cell.

In some embodiments, the obtaining of the ingredient list may include creating the ingredient list when an input representing completion of an ingredient selection is received from the user in the storage table or when each of the cells has no weight change for a predetermined time.

In some embodiments, the obtaining of the ingredient list may further include outputting the ingredient list to a display unit.

In some embodiments, the determining of the recipe may include: classifying a menu stored in the memory and an ingredient included in the menu; calculating a similarity between an ingredient of the ingredient list and the ingredient included in the menu; and selecting a menu with a largest similarity, and controlling the cooking with the recipe of the selected menu.

In some embodiments, the calculating of the similarity may include: comparing the ingredient of the ingredient list with the ingredient of the menu stored in the robot; and comparing an amount of the ingredient of the menu with an amount of the ingredient included in the ingredient list.

In some embodiments, the method may further include recommending an additional ingredient to the user during or after the control of the cooking, after the determining of the recipe.

The details of one or more embodiments are set forth in the accompanying drawings and the description below. Other features will be apparent from the description and drawings, and from the claims.

DETAILED DESCRIPTION OF THE EMBODIMENTS

Figure 1:
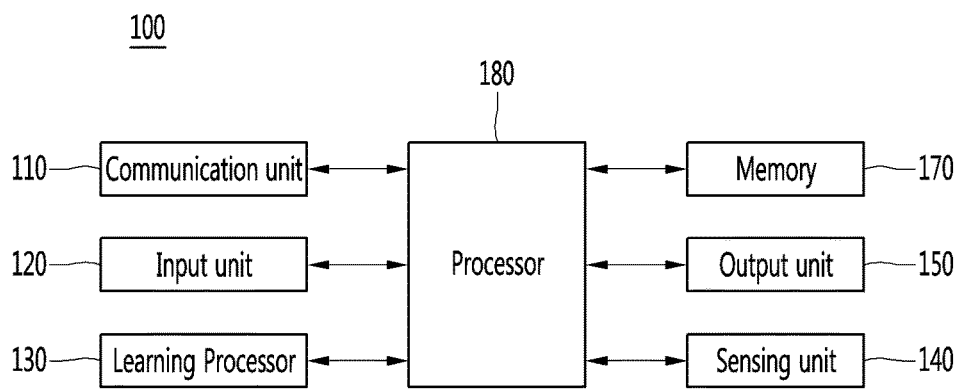
FIG. 1 illustrates an AI device including a robot according to one embodiment.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
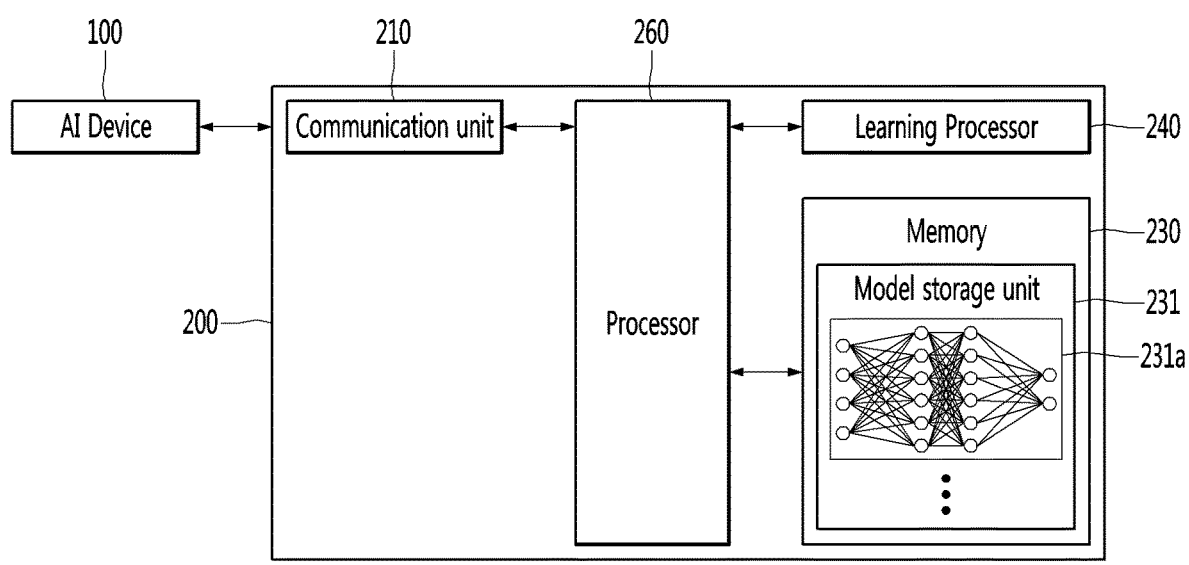
FIG. 2 illustrates an AI server connected to the robot according to one embodiment.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
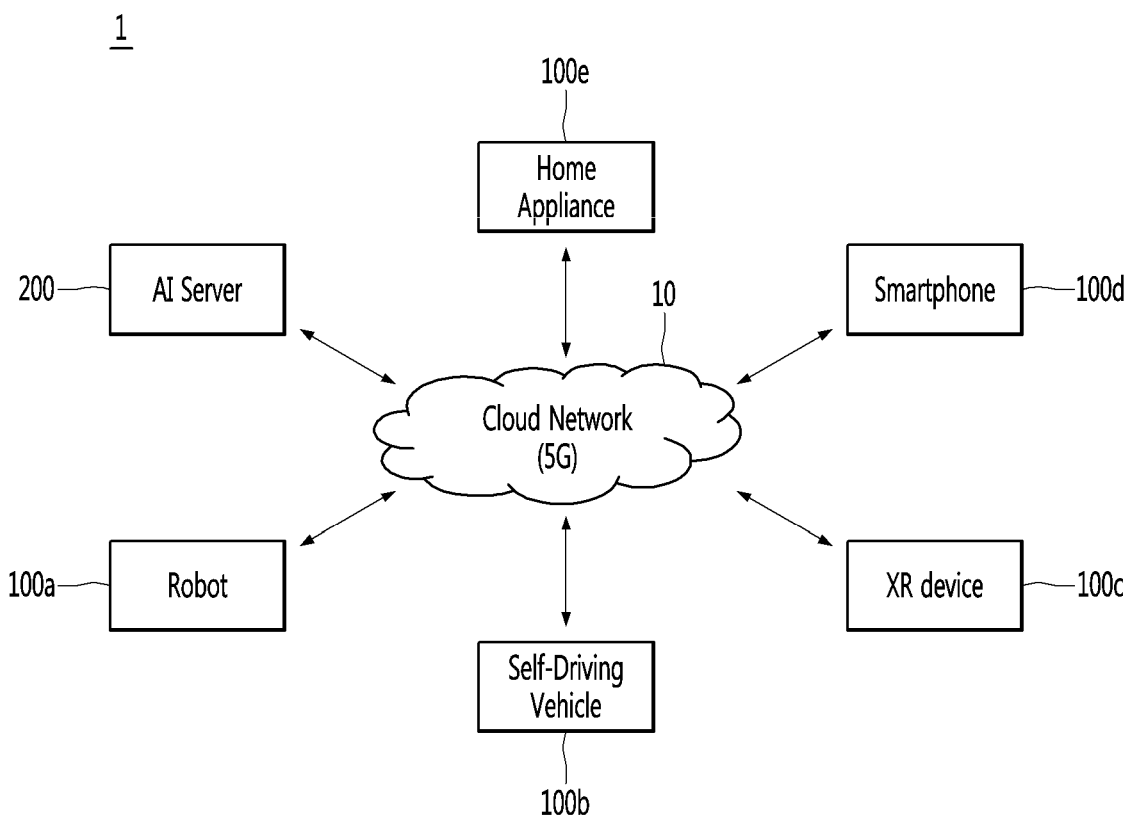
FIG. 3 illustrates an AI system including the robot according to one embodiment.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Figure 4:
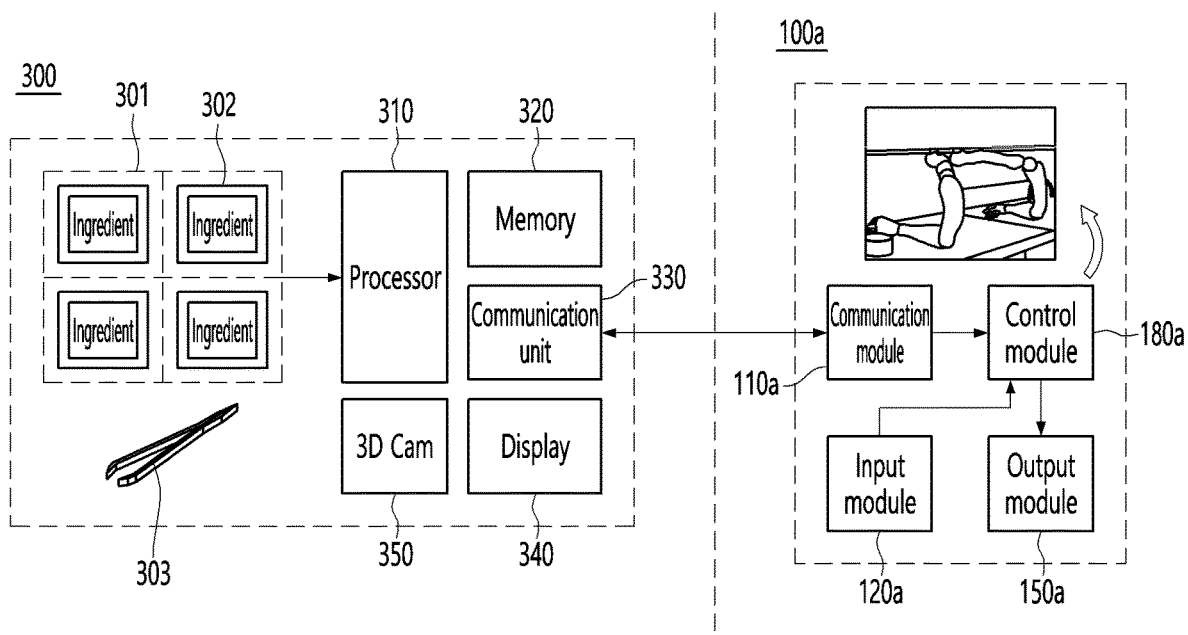
FIG. 4 illustrates a structure of a robot system including a storage table and a robot according to an embodiment.

FIG. 4 illustrates a structure of a robot system including a storage table 300 and a robot according to an embodiment.

Referring to FIG. 4, the robot system includes the storage table 300 and the robot 100*a*.

The storage table 300 may detect a weight change by a scale 302 installed under each of cells 301 that store ingredients according to types of the ingredients, detect the cell 301 of which a weight is changed according to an ingredient selection of a user to identify a type of the ingredient, and identify an amount of the ingredient based on a degree of the weight change of the cell 301.

The robot 100*a* may receive the ingredient list obtained from the type and the amount of the ingredient identified by the storage table 300 from the storage table 300, retrieve menus to be cooked with the ingredient list, and perform cooking by determining the recipe according to a menu selected from the menus.

The storage table 300 may include the cell 301, the scale 302, and a pincette 303, and may include a memory 320, a processor 310, a communication unit 330, a display unit 340, and a 3D cam 350 that process information about the cell 301, the scale 302, and the pincette 303.

The storage table 300 stores the ingredient and manages the type and a remaining amount of the ingredient, the cell 301 is a place for carrying each ingredient. The scale 302 may be installed under the cell 301 to measure the weight change of the cell 301. The pincette 303 is a tool for picking up the ingredient, and may be a device for tracking an operation of the user.

The processor 310 and the communication unit 330 of the storage table 300 may perform a function similar to a control module 180*a* and a communication module 110*a* of the robot 100*a*.

The storage table 300 may include: a memory 320 configured to store the type of the ingredient stored in each of the cells 301; a processor 310 configured to retrieve the cell 301 of which the weight is changed from the memory 320 to identify the type of the ingredient, and obtain the ingredient list based on the type and the amount of the ingredient; a communication unit 330 configured to transmit the ingredient list to the robot 100*a*; and a display unit 340 configured to display the type and the amount of the ingredient and the ingredient list to allow the user to identify the type and the amount of the ingredient and the ingredient list.

In this case, the storage table 300 may include: a pincette 303 configured to move the ingredient from the cell 301 to a bowl of the user; and a 3D cam 350 configured to track the movement of the pincette 303, wherein the type of the ingredient may be tracked based on the movement from the pincette 303 to the cell 301.

The storage table 300 may generates data about the weight change occurring in the cell 301 and the movement of the pincette 303 to transmit the generated data to the robot 100*a*, and the robot 100*a* may be operated such that the robot 100*a* is controlled based on the data received from the storage table 300.

The robot 100*a* may include: a communication module 110*a* configured to receive the ingredient list from the storage table 300; and a control module 180*a* configured to select the menu to be cooked with the ingredient list, determine the recipe according to the selected menu, and control the cooking according to the recipe.

The control module 180*a* may be configured to classify a menu stored in the memory 320 and an ingredient included in the menu, calculate a similarity between an ingredient of the ingredient list and the ingredient included in the menu to select a menu with a largest similarity, and control the cooking with the recipe of the selected menu.

The similarity is a process of identifying the ingredient from the ingredient list received from the storage table 300 and retrieving a menu including the corresponding ingredient among previously stored data.

The control module 180*a* may be configured to primarily compare the ingredient of the ingredient list with the ingredient of the menu, and secondarily compare an amount of the ingredient of the menu with an amount of the ingredient included in the ingredient list.

In other words, the ingredients included in a previously stored menu are listed first, and the types of the ingredients are arranged with respect to data of the listed ingredients. When the ingredient list is received from the storage table 300, the most similar menu is selected by comparing the ingredient list with the arranged types of the ingredients. When the menu is selected, the cooking of the robot 100*a* may be controlled according to the corresponding menu.

In addition, the user may select a menu according to an ingredient selected through an input module 120*a* instead of an automatic tracking process, and may set to automatically determine the recipe according to the selected menu.

The control module 180*a* may be configured to recommend an additional ingredient to the user during or after the control of the cooking. The additional ingredient may be a seasoning or a sauce that may be additionally added while performing the cooking, or may include spices or the like for stimulating an appetite after the cooking.

In this case, the additional ingredient that may be added to the above menu is stored in advance, so that the robot 100*a* may recommend an ingredient that is appropriate for the menu and may be additionally put into the menu when the menu is determined.

The robot 100*a* may further include: an input module 120*a* configured to receive a command of the user through at least one of a touch, a button, or a voice input from the user; and an output module 150*a* configured to express the command of the input module 120*a* and an operational state of the control module 180*a* to the user by using a screen or a sound.

The input module 120*a* may provide an interface with the user to receive information on the control of cooking from the user, and the output module 150*a* may be a device that may inform the user of a process that the cooking is being controlled.

The input module 120*a* and the output module 150*a* may be controlled by the display unit 340, may include a separate input/output device, and may perform input/output in the system by using the screen or the sound.

Figure 5:
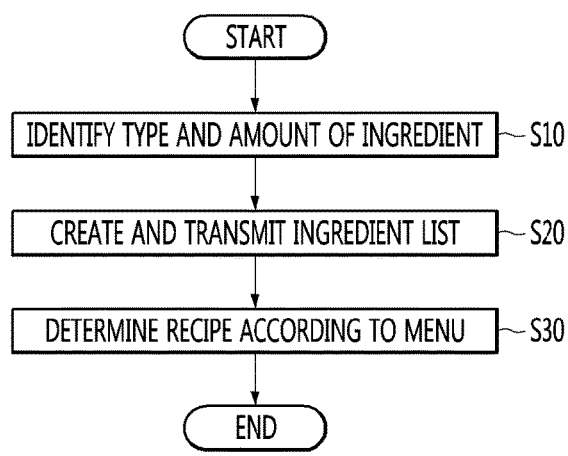
FIG. 5 is a flowchart of a method of controlling a robot system according to one embodiment.

FIG. 5 is a flowchart of a method of controlling a robot system according to one embodiment.

Referring to FIG. 5, the method according to the embodiment may include: identifying S10 a type and an amount of an ingredient; creating S20 an ingredient list to transmit the created ingredient list; and determining S30 a recipe according to a menu.

The identifying S10 of the type and the amount of the ingredient may be a process of identifying a type of the ingredient by detecting a cell 301 of which a weight is changed according to an ingredient selection of a user through a scale 302 installed under the cell 301, and identifying an amount of the ingredient by calculating the weight change of the cell 301.

The creating S20 of the ingredient list to transmit the created ingredient list may be a process of obtaining, by the storage table 300, an ingredient list through the type and the amount of the ingredient to transmit the ingredient list to a robot 100*a*.

The determining S30 of the recipe according to the menu may be a process of determining, by the robot 100*a*, the recipe according to the menu by retrieving a menu to be cooked with the ingredient list.

Each operation described above will be described in detail below with reference to FIGS. 6 to 9. In addition, one embodiment will be described with reference to FIGS. 6 and 7, and another embodiment will be briefly described with reference to FIGS. 8 and 9.

Figure 6:
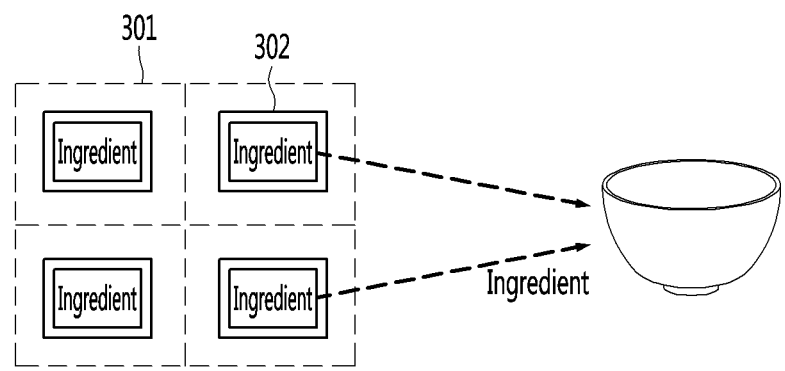
FIG. 6 illustrates a state of determining a type and an amount of an ingredient through a position of each cell and a scale according to one embodiment.

FIG. 6 illustrates a state of determining a type and an amount of an ingredient through a position of each cell 301 and a scale 302 according to one embodiment.

Referring to FIG. 6, it can be seen that the weight may be detected through the scale 302 disposed under each cell 301 in which the ingredient is put.

The ingredient is put by the user, and the weight may be detected using the scale 302 while the storage table 300 operates. When the weight is detected, data before and after the change of each cell 301 is recorded, and the type and the amount of ingredient may be detected through the recorded data.

Figure 7:
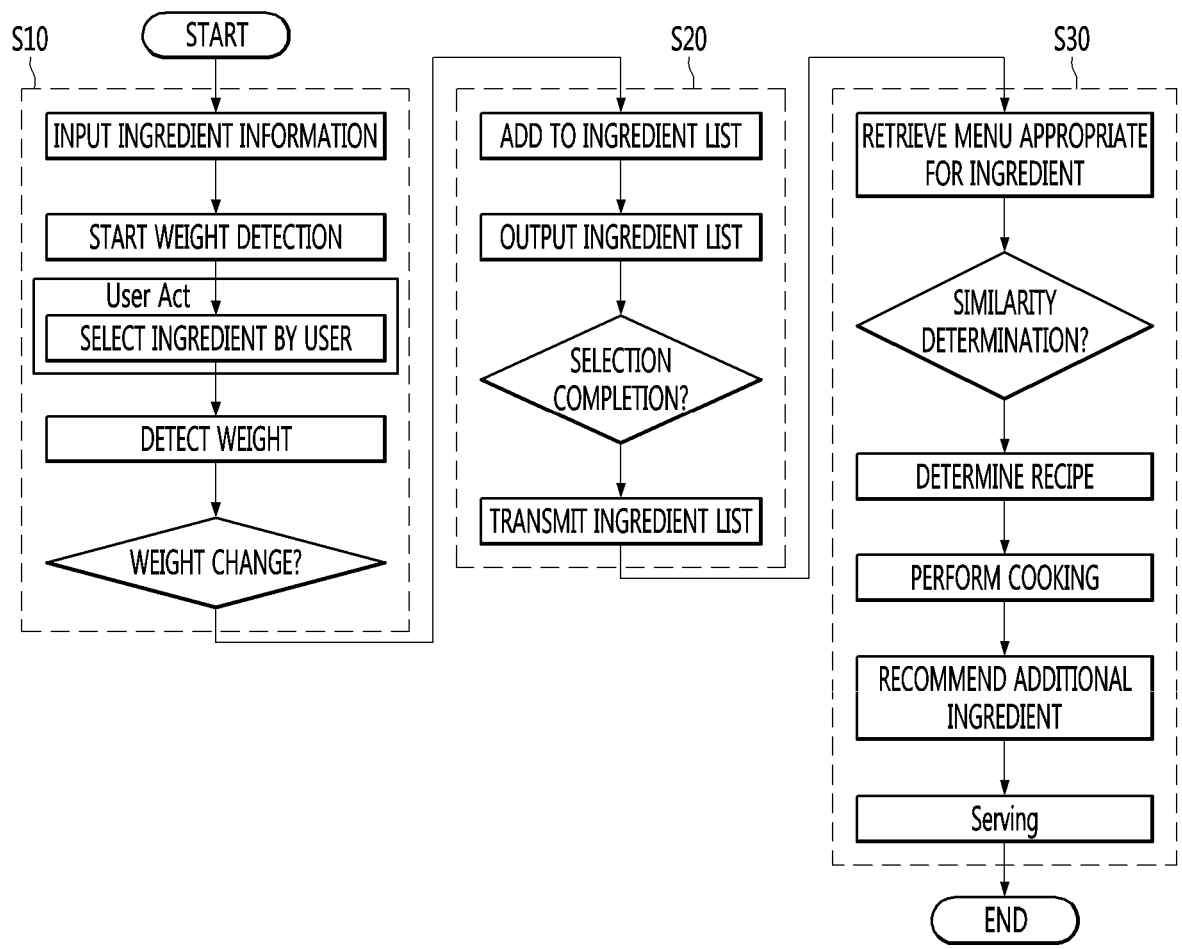
FIG. 7 is a detailed flowchart of the method of controlling the robot system in association with FIG. 6 according to one embodiment.

FIG. 7 is a detailed flowchart of the method of controlling the robot system in association with FIG. 6 according to one embodiment.

Referring to FIG. 7, the identifying S10 of the type and the amount of the ingredient, the creating S20 of the ingredient list to transmit the created ingredient list, and the determining S30 of the recipe according to the menu may be sequentially shown in detail.

The identifying S10 of the type and the amount of the ingredient may include a process of inputting ingredient information and detecting the weight.

The identifying S10 of the type and the amount of the ingredient may include: storing a name of the ingredient stored in each of the cells 301 in a memory 320; detecting a position of the cell 301 of which the weight is changed; and retrieving the detected position of the cell 301 from the memory 320 to identify the name of the ingredient, and identifying the amount of the ingredient from the weight change of the cell 301.

The inputting of the ingredient information is performed such that a manager puts the ingredient into a tray which is in the form of the cell 301 and inputs what ingredient is contained in each cell 301 to the robot 100*a*. The start of the detecting of the weight is performed such that the storage table 300 starts to detect the weight of an object contained in each cell 301. After the ingredient selection of the user, the storage table 300 may measure the weight of each cell 301 to check whether there is a change, and the storage table 300 may proceed to the next operation when the weight is changed and detect whether the weight change continuously occurs when there is no weight change.

The creating S20 of the ingredient list to transmit the created ingredient list may include creating the ingredient list when an input representing completion of an ingredient selection is received from the user in the storage table 300 or when each of the cells 301 has no weight change for a predetermined time. In addition, the ingredient list may be output to a display unit 340.

When the weight change is detected, the storage table 300 assumes that the user has put the ingredient so as to add the ingredient in the ingredient list. In the ingredient list, a currently selected ingredient and an amount thereof may be output to a display. The completion of the ingredient selection is a process of inputting the selection completion by the user when the ingredient selection has been completed.

Ingredient list transmission is a process of transmitting the ingredient, which is selected by the user so far, to the robot 100*a* by the storage table 300.

The determining S30 of the recipe according to the menu may include: classifying a menu stored in the memory 320 and an ingredient included in the menu; calculating a similarity between an ingredient of the ingredient list and the ingredient included in the menu; and selecting a menu with a largest similarity, and controlling the cooking with the recipe of the selected menu.

The calculating of the similarity may include: comparing the ingredient of the ingredient list with the ingredient of the menu stored in the robot 100*a*; and comparing an amount of the ingredient of the menu with an amount of the ingredient included in the ingredient list.

The similarity is a process of identifying the ingredient from the ingredient list received from the storage table 300 and retrieving a menu including the corresponding ingredient among previously stored data.

The ingredient of the ingredient list may be primarily compared with the ingredient of the menu, and an amount of the ingredient of the menu may be secondarily compared with an amount of the ingredient included in the ingredient list.

In other words, the ingredients included in a previously stored menu are listed first, and the types of the ingredients are arranged with respect to data of the listed ingredients. When the ingredient list is received from the storage table 300, the most similar menu is selected by comparing the ingredient list with the arranged types of the ingredients. When the menu is selected, the cooking of the robot 100*a* may be controlled according to the corresponding menu.

The recipe determination is performed by the robot 100*a*, in which the robot 100*a* composes the recipe by using the transmitted ingredient list. In some embodiments, a candidate recipe may be output to the user after the composition. The user may select one of the output recipes to transmit the selected recipe to the robot 100*a*, and the robot 100*a* may select a final recipe based on the input information.

The method may further include recommending an additional ingredient to the user during or after the control of the cooking, after the determining S30 of the recipe.

The robot 100*a* may perform the cooking according to the selected recipe, and the robot 100*a* may guide the user with an additional ingredient list suitable for a current food during the cooking or when the cooking is completed. Thereafter, the robot 100*a* may deliver the cooked food to the user.

In addition, the user may select a menu according to an ingredient selected through an input module instead of an automatic tracking process, and may set so that the recipe may be automatically determined according to the selected menu.

Figure 8:
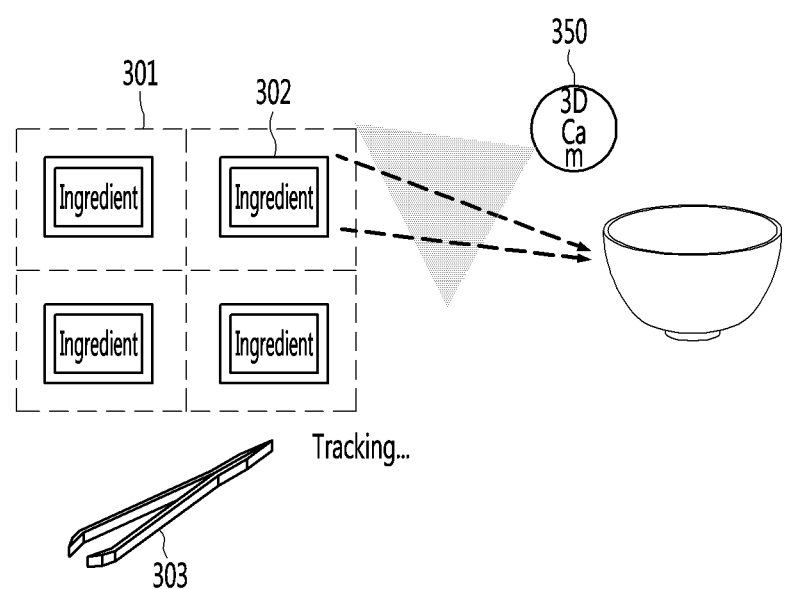
FIG. 8 illustrates a state of determining the type of the ingredient by tracking a position of a pincette with a 3D cam according to another embodiment.

FIG. 8 illustrates a state of determining the type of the ingredient by tracking a position of a pincette 303 with a 3D cam 350 according to another embodiment.

Figure 9:
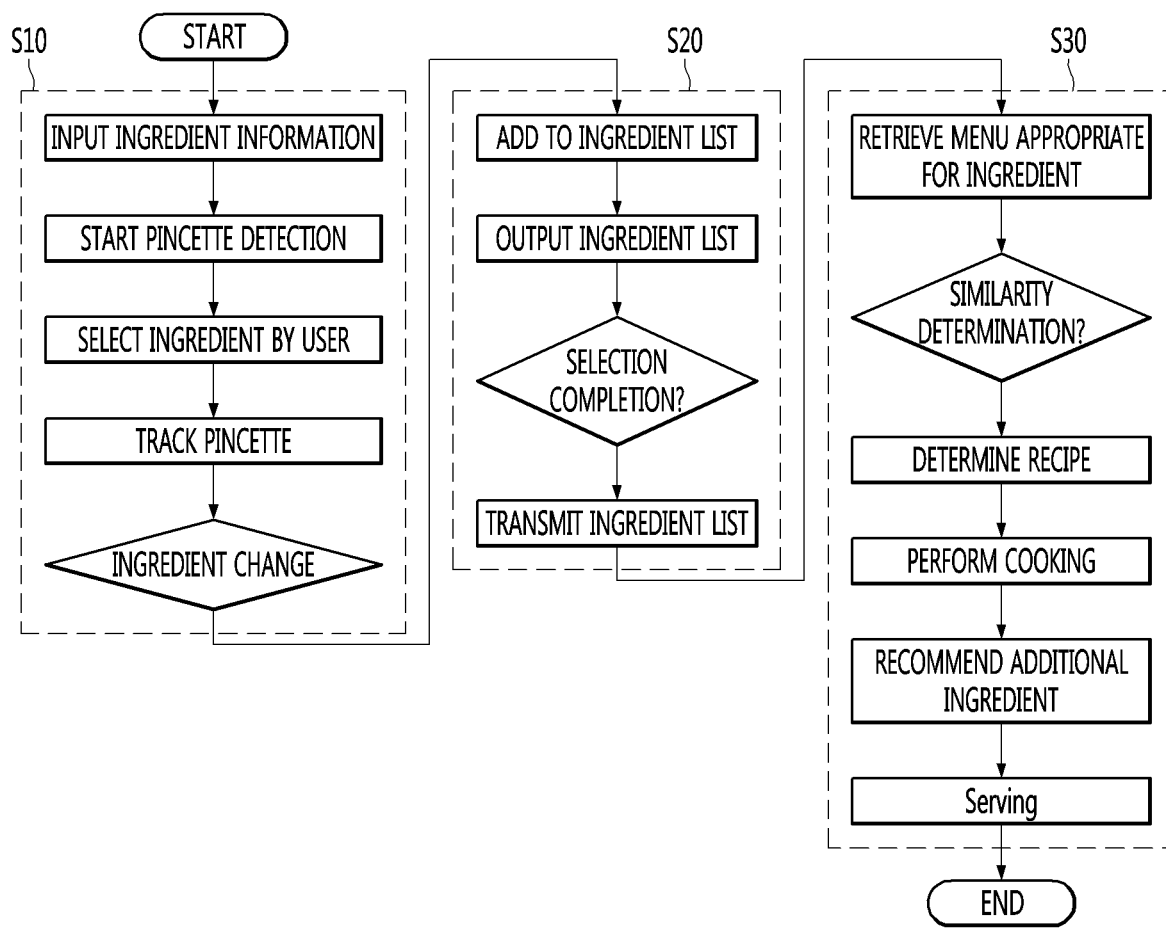
FIG. 9 is a detailed flowchart of the method of controlling the robot system in association with FIG. 8 according to another embodiment.

FIG. 9 is a detailed flowchart of the method of controlling the robot system in association with FIG. 8 according to another embodiment.

In FIGS. 8 and 9, the process of identifying the type of the ingredient by classifying the cells 301 may be replaced with a process of tracking the pincette 303 with the 3D cam 350. Alternatively, in some embodiments, the process of tracking the ingredient with the cell 301 and the process of tracking the pincette 303 may be simultaneously adopted to increase the accuracy.

According to embodiments having the configuration as described above, the user can automatically determine the recipe by identifying the ingredient without the input for the ingredient, the cooking time can be automatically determined according to the ingredient, the information related to the ingredient can be provided to the user, and the additional ingredient can be recommended.

According to embodiments having the configuration as described above, the user can automatically determine a recipe by identifying an ingredient without an input for the ingredient.

In addition, according to the embodiments, a cooking time can be automatically determined according to the ingredient, information related to the ingredient can be provided to a user, and an additional ingredient can be recommended.

In addition, according to the embodiments, a manager can conveniently perform inventory management.

Although the present disclosure has been described in detail with reference to the representative embodiments, it will be apparent to a person with ordinary skill in the art to which the present disclosure pertains that various modifications can be made to the embodiments described above without departing from the scope of the present disclosure. Therefore, the scope of the present disclosure should not be limited to the aforementioned embodiments, but should be defined by all changes or modifications derived from the appended claims and the equivalent concepts thereof.

What is claimed is:

1. A robot system configured to determine a recipe from an ingredient list obtained by detecting a type and an amount of an ingredient, the robot system comprising:
   a storage table configured to:
      detect a weight change by a scale installed under each of cells that store ingredients according to types of the ingredients;
      detect the cell of which a weight is changed according to an ingredient selection of a user;
      identify the type of the ingredient by the detected cell of which the weight is changed; and
      determine the amount of the identified ingredient by calculating a degree of the weight change of the detected cell; and
   a robot configured to:
      receive the ingredient list obtained from the type and the amount of the ingredient identified by the storage table from the storage table;
      retrieve menus to be cooked with the ingredient list; and
      perform cooking by determining the recipe according to a menu selected from the menus,
   wherein the storage table includes:
      a memory configured to store the type of the ingredient stored in each of the cells;
      a processor configured to:
         retrieve the cell of which the weight is changed from the memory to identify the type of the ingredient; and obtain the ingredient list based on the type and the amount of the ingredient; and a communication interface configured to transmit the ingredient list to the robot, and wherein the robot includes:

a communication interface configured to receive the ingredient list from the storage table; and a controller configured to: classify a menu stored in the memory and an ingredient included in the menu; calculate a similarity between an ingredient of the ingredient list and the ingredient included in the menu to select a menu with a largest similarity; and select the menu to be cooked with the ingredient list; determine the recipe according to the selected menu; and control the cooking according to the recipe.

2. The robot system according to claim 1, wherein the storage table further includes:

a display configured to display the type and the amount of the ingredient and the ingredient list to allow the user to identify the type and the amount of the ingredient and the ingredient list.

3. The robot system according to claim 1, wherein the storage table further includes:

a pincette configured to move the ingredient from the cell to a bowl of the user; and a 3D (3-dimensional) cam configured to track the movement of the pincette, and the type of the ingredient is tracked based on the movement from the pincette to the cell.

4. The robot system according to claim 1, wherein the controller is configured to:

primarily compare the ingredient of the ingredient list with the ingredient of the menu; and secondarily compare an amount of the ingredient of the menu with an amount of the ingredient included in the ingredient list.

5. The robot system according to claim 1, wherein the controller is configured to recommend an additional ingredient to the user during or after the control of the cooking.

6. The robot system according to claim 1, wherein the robot further includes:

an input interface configured to receive a command of the user through at least one of a touch, a button, or a voice input from the user; and an output interface configured to express the command of the input interface and an operational state of the controller to the user by using a screen or a sound.

7. The robot system according to claim 1, wherein the recipe is one that is based on the type and the amount of the ingredient selected by the user.

8. A method of controlling a robot system which is configured to determine a recipe by measuring a weight change of each of cells in a storage table that stores an ingredient, the method comprising:

detecting a cell of which a weight is changed according to an ingredient selection of a user through a scale installed under the cell;

identifying a type of the ingredient by the detected cell of which the weight is changed;

determining an amount of the identified ingredient by calculating a degree of the weight change of the detected cell;

obtaining, by the storage table, an ingredient list through the type and the amount of the ingredient to transmit the ingredient list to a robot;

transmitting, by the storage table, the ingredient list to the robot;

receiving, by the robot, the ingredient list from the storage table;

determining, by the robot, the recipe according to the menu by classifying a menu stored in the memory and an ingredient included in the menu; calculating a similarity between an ingredient of the ingredient list and the ingredient included in the menu; and selecting a menu with a largest similarity, and retrieving a menu to be cooked with the ingredient list; and controlling the cooking with the recipe of the selected menu.

9. The method according to claim 8, wherein the identifying of the type includes:

storing a name of the ingredient stored in each of the cells in a memory;

detecting a position of the cell of which the weight is changed; and retrieving the detected position of the cell from the memory to identify the name of the ingredient.

10. The method according to claim 8, wherein the obtaining of the ingredient list includes creating the ingredient list when an input representing completion of an ingredient selection is received from the user in the storage table or when each of the cells has no weight change for a predetermined time.

11. The method according to claim 8, wherein the obtaining of the ingredient list further includes outputting the ingredient list to a display.

12. The method according to claim 8, wherein the calculating of the similarity includes:

comparing the ingredient of the ingredient list with the ingredient of the menu stored in the robot; and comparing an amount of the ingredient of the menu with an amount of the ingredient included in the ingredient list.

13. The method according to claim 8, further comprising recommending an additional ingredient to the user during or after the control of the cooking, after the determining of the recipe.

14. The method according to claim 8, wherein the recipe is one that is based on the type and the amount of the ingredient selected by the user.

* * * * *